United States Patent [19]

Schiesser

[11] 4,265,756
[45] May 5, 1981

[54] CHANGE DEVICE FOR SIEVES FOR FILTERING PLASTIC MATERIALS

[75] Inventor: Walter H. Schiesser, Zürich

[73] Assignee: Schiesser AG, Switzerland

[21] Appl. No.: 103,169

[22] Filed: Dec. 13, 1979

[30] Foreign Application Priority Data

Jan. 29, 1979 [CH] Switzerland .......................... 865/79

[51] Int. Cl.³ ............................................. B01D 35/12
[52] U.S. Cl. .................................... 210/236; 209/400; 209/403; 210/447; 425/197
[58] Field of Search ............... 209/235, 243, 262, 400, 209/403; 210/236, 447, 460, X

[56] References Cited

U.S. PATENT DOCUMENTS

| 3,059,276 | 10/1962 | Yokana | 425/199 X |
| 3,675,934 | 7/1972 | Heston | 425/199 X |
| 3,962,092 | 6/1976 | Newman, Jr. | 425/199 X |

Primary Examiner—William A. Cuchlinski, Jr.
Attorney, Agent, or Firm—Ostrolenk, Faber, Gerb & Soffen

[57] ABSTRACT

A change device for sieves used for filtering plastic materials. The change device comprises a sieve holder having a bore for the throughflowing material and a slot extending transversely thereto, in which there are sealingly retained in work position sieve supports or carriers containing sieves. By means of a work cylinder it is possible, without interrupting the transport of the material which is being processed, to eject and replace the contaminated sieve by a new sieve. The rapid change device is particularly suitable for installation in an extruder for fabricating rubber hoses for automobile tires, the installation of such rapid change device advantageously being accomplished between the extruder and the injection head.

1 Claim, 3 Drawing Figures

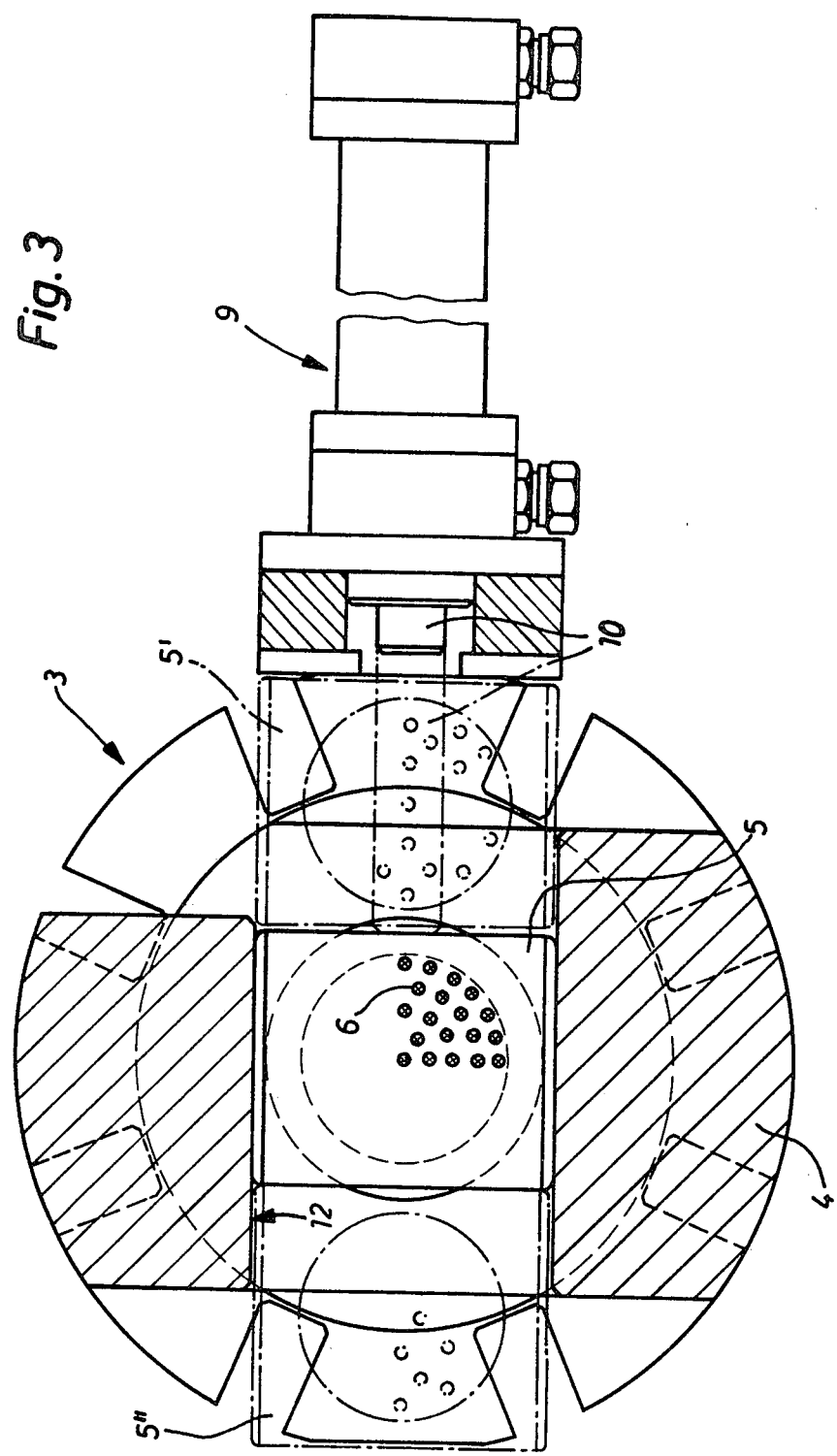

CHANGE DEVICE FOR SIEVES FOR FILTERING PLASTIC MATERIALS

BACKGROUND OF THE INVENTION

The present invention relates to a new and improved construction of rapid change device for seives for straining or filtering plastic materials, such as typically, for instance, rubber, plastics and so forth.

During the extrusion of certain sectional shapes or hoses, particularly when fabricating pneumatic hoses for automobile tires, it is necessary that the plastic mass, which in the case of pneumatic hoses for vehicles or automobile tires consists of butyl rubber, be cleaned of foreign bodies or contaminants before it is further delivered for final fabrication or processing.

Both in this case, and also during the fabrication of sectional shapes, where there must be used filtered mixtures, in other words quite pure mixtures, it is generally a widely adopted procedure throughout the world that the unvulcanized mixture, following the mixing operation, is transported during a separate working step through a so-called strainer, i.e. a large extruder having filter sieves. The contaminants, which, on the one hand, are attributable to the raw materials which are used, and, on the other hand, also can be formed during the fabrication operation and during handling of the mixture while it is being processed until the final mixing thereof, are entrapped during this straining or filtering process. Hence, a clean mixture effluxes out of the strainer.

Depending upon the degree of the contaminants in the mixture, the sieves must sometimes be exchanged within relatively short time spans, for instance every ten minutes. When working with a strainer, where this filtering operation is carried out in separate working steps, one technique which has been employed in order to save time is to work with two injection or spraying heads. If the sieves or filters, which filter the mixtures, are clogged and must be exchanged, then the machine is stopped, the ejection head is dismantled from the extruder machine and rocked or pivoted out by means of a hinge arrangement. Then the second injection head with new sieves is again pivoted-in by means of a hinge arrangement mounted at the other side and fixed in place. Now the extrusion operation can be restarted. During the straining of the mixture or processed material at the second injection head the first injection head is cleaned and loaded with new, clean mesh sieves, typically wire sieves or filters.

This separate straining operation requires a separate work process during which, when working in shifts at the plant, it is necessary to employ for each shift at least two operators. Additionally, the cleaning of the entire first injection head and ultimately thereafter the second injection head requires a large expenditure in work on the part of the plant personnel. Also, this cleaning operation results in a corresponding loss of a certain amount of the mixture material. Just as was heretofore the case, even with this technique there exists, however, the danger of a renewed contamination of the mixture during handling, since the effluxing material "spaghettis" do constitute a semi-finished product which thereafter must be processed at the rolling mill or the like, in order to be finally delivered to the extruder fabricating the final product, whether it be hoses or sectional shapes or the like.

SUMMARY OF THE INVENTION

Therefore, with the foregoing in mind it is a primary object of the present invention to provide a new and improved construction of change device for sieves for straining or filtering plastic materials in order to overcome the aforementioned drawbacks and limitations of the prior art proposals discussed above.

Another and more specific object of the present invention is to provide a new and improved construction of change device for sieves or the like which avoids the existing drawbacks in that it is possible to carry out the filtering operation during the extrusion work for the end product, whether such be a sectional shape or hose, in one working operation.

Yet a further significant object of the present invention and in keeping with the immediately preceding object is to provide means useful for a processing machine, such as an extruder, which ensures for absolutely clean final products, since there is eliminated the possibility of any new contamination of the processed material following its filtering by eliminating any further handling of such material.

A further important object of the present invention is to provide a new and improved construction of change device for sieves used in processing plastic materials, which change device is relatively simple in construction and design, economical to manufacture, extremely reliable in operation, and not readily subject to breakdown or malfunction, requires a minimum of maintenance and servicing and ensures that the processed material is not contaminated following filtration thereof due to elimination of any handling of such processed material.

Now in order to implement these and still further objects of the invention, which will become more readily apparent as the description proceeds, the sieve change device of the present invention, which advantageously can be installed between the extruder and the injection head, is manifested by the features that a sieve holder can be mounted along the flow path of the processed material. Exchangeable sieve supports or carriers containing sieves can be directly inserted in succession into the sieve holder. The sieve support with its sieve, located in its work position can be sealed by a sealing device so that the sieve support which is in its work position is sealingly retained in the direction of flow of the material which is being processed. Further, there are provided means in order to forwardly advance or shift the tandemly arranged sieve supports together with their sieves when necessary, and thus to place each momentarily trailing or upstream sieve in its work position.

Particularly when the change device is used in conjunction with the actual extruder there can be realized, among other things, the following noteworthy advantages:

(1) There is not required any separate work operation or step, so that there is a saving in operating personnel, attendant wages, and other expenses, and also there is eliminated the expense of additional energy costs.

(2) There is realized a saving in space since, apart from the production or fabrication machine for fabricating the end product, for instance sectional shapes or hoses, which must be available in any event, there is not required any additional space.

(3) There is realized an absolutely clean end product, since renewed contamination thereof, following straining of the processed material, cannot arise since there is eliminated any additional handling.

(4) There is produced a uniform and outstanding end product, since only one pass through the extruder is needed, namely during the fabrication of the end product.

(5) There is a saving in processed material since, in the heretofore employed systems of the prior art using two injection heads, as described above, there remains appreciately more material which must be thrown away than when using the inventive device.

It is also mentioned that the change device of the present development is preferably composed of a flange plate installed between the end of the extruder cylinder and the injection head for the end product. The change device therefore can be considered, as a practical matter, as constituting part of the injection head.

Each sieve support advantageously comprises a perforated or apertured plate, at the front side or face of which, viewed in the direction of material flow, there is arranged one or a number of sieves or equivalent structure.

The feed or advancing means preferably comprise a work cylinder, the plunger of which assumes the task of periodically forwardly advancing the sieve support.

The main part of the device, i.e. the sieve holder, possesses a bore for the throughflow of the material. Advantageously, a guide slot for the sieve support is provided transversely with respect to this bore.

The sealing device comprises, according to a particularly advantageous constructional embodiment, a sleeve arranged forwardly of the sieve support. The inner wall of such sleeve advantageously is conically tapered, and a sealing ring is arranged following the sieve support.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the sieve change device shown in FIG. 2.

DETAILED DESCRIPTION OF THE PREFERRED EMBODIMENTS

Figure 1:
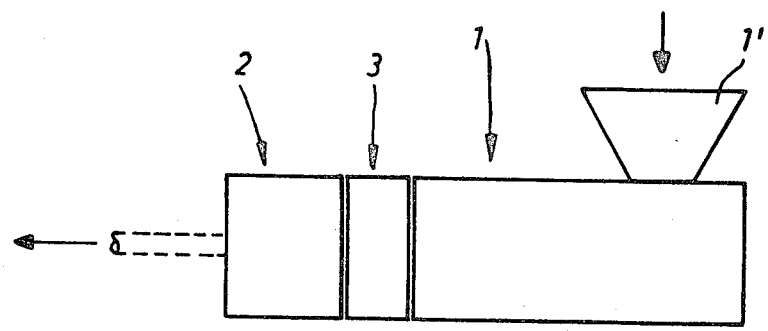
FIG. 1 is a schematic view of an extruder equipped with a sieve change device constructed according to the invention.

Describing now the drawings, it is to be understood that only enough of the construction of the extruder installation with which the sieve change device is employed has been shown in the drawings to simplify the illustration, while enabling those skilled in the art to fully understand the underlying principles and concepts of the present invention. Turning attention now therefore to FIG. 1, there is shown therein, by way of example, an installation for the extrusion of a desired product, here assumed to be hoses. The extrusion installation will be seen to comprise the actual extruder 1, containing the material filling funnel or material filling means 1', the injection or spray head 2 and a sieve change device 3 constituting the subject matter of the invention. This sieve change device 3 will be seen to comprise a sieve support or carrier 5 arranged exactly in the dirction of throughflow of the processed material between the extruder 1 and the injection head 2 and enables straining of such processed material.

Figure 2:
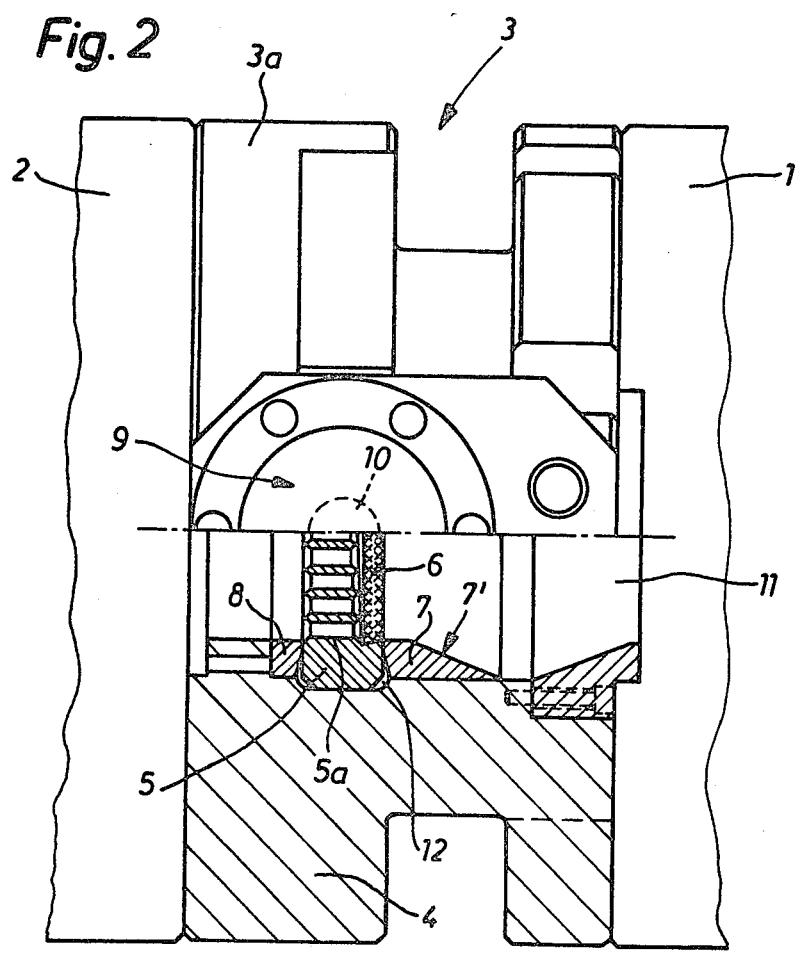
FIG. 2 is a fragmentary, enlarged side view, partially in section, of a sieve change device according to the invention.

Turning attention now to FIGS. 2 and 3 of the drawings, there is shown in detail therein the actual sieve change device 3 of the invention. It will be seen to comprise a flange element or piece 3a forming the actual sieve holder 4. Retained in the sieve holder 4 are the sieve supports or carriers 5, which, in the illustrated exemplary embodiment, are constructed as perforated plates 5a retained in a transversely extending guide slot 12 or equivalent structure.

At the side of the perforated plate 5a, confronting the flow of material, there are usually mounted two to four sieves or filters formed of steel wire. For sealing the sieve support or carrier 5 there is provided in a bore 11, at one side of the perforated plate 5a, a sleeve 7 having a conically tapered inner wall 7', and at the other side of such perforated plate 5a there is arranged in such bore 11 a sealing ring or sealing means 8. The sleeve 7 and the sealing ring 8 are fabricated from any suitable material, preferably metal, which is softer than the material from which there is formed the perforated plate 5a. By virtue of the conically tapered inner surface or wall 7' of the sleeve 7, extending over part of the sleeve width and in the material throughflow direction, the sleeve 7 is pressed by the frictional force of the through-flowing material, effective at such conical inner surface 7', against the perforated plate 5a. In other words, due to this force which is exerted in the sleeve 7, the perforated plate 5a and the sealing ring 8 snugly sealingly bear against one another, so that there is formed a perfect seal. Since relatively small contact surfaces are provided between the sleeve 7 and the perforated plate 5 and between the perforated plate 5 and the sealing ring 8, there are formed correspondingly high specific contact pressures. The sealing action is furthermore augmented due to the different hard materials from which there is formed, on the one hand, the perforated plate 5a and, on the other hand, the sleeve 7 and sealing ring 8.

By referring to FIG. 2 it will be seen how, by means of a hydraulic or pneumatic cylinder 9 it is possible by means of its plunger or rod 10, to displace the sieve supports 5 and 5', i.e. the corresponding perforated plates, and thus to periodically exchange the same. With the illustrated exemplary embodiment the sieve support 5 is located in its work position, whereas the phantom line shown sieve support 5', during the next forward stroke or advance, is brought into its work position, so that then the sieve support 5 is shifted into the position 5", shown in phantom line, at which location it can be removed for cleaning purposes.

In the description to follow there will be briefly again referred to the most important parts of the equipment and their function:

The sieve holder 4 accommodates the overhung parts. Two perforated plates 5a, constructed as slides, serve to retain the sieves or filters 6. Following contamination of the sieves 6 the perforated plates 5a are exchanged by the action of the work cylinder 9 within a few seconds, i.e., without interrupting the working process, in that the one sieve support 5' i.e. the perforated plate 5a thereof, is inserted between the first sieve support 5 i.e. the perforated plate 5a thereof and the plunger 10 of the work cylinder 9 and shifted into the proper position. During this shifting or displacement movement the first and now contaiminated sieve support 5 i.e. its perforated plate 5a is ejected to the other side and can now be cleaned, whereas it is possible to continue the work with the second sieve support 5' i.e. its perforated plate 5a. These operations repeat continuously at greater or shorter time intervals, depending upon the degree of contamination of the plastic mass.

The hardened, inserted sealing ring 8, located at the outlet side of the sieve holder 5, ensures for faultless sliding of the sieve holder 5 during the insertion and exchange operation.

An appreciable aspect of the invention is the fact that there can be realized a faultless sealing action during the extrusion operation, and specifically, in that no material can laterally escape the end surfaces forwardly and rearwardly of the perforated plates 5a.

In the embodiment under discussion this sealing action is accomplished by the sleeve or sleeve member 7 together with the inner conical portion or tapered walls 7'. The material effluxing out of the extruder 1 initially impacts against the conical surface or wall 7' and presses such, due to the prevailing friction at the perforated plates 5a, against the hardened sealing ring or seal means 8. Consequently, both sides of each of the perforated plates 5a located in its work position are faultlessly sealed and there cannot escape any material which is being processed.

Different attempts have already been made to construct similar rapid change devices for sieves or the like, wherein a ground plate has been used as the slide or displacement element and also the contact surfaces have been completely ground. Already after several hundred displacement operations or shifting movements either the plate has bent through or it has been pitted, or, however, it could not be completely sealed since it also had to be moved. It is for these reasons that an absolute positive seal could not be obtained at any time, and following the shortest operating time of the equipment it was found that a great deal of material continuously escaped laterally resulting in valuable material losses of the processed plastic mass. The inventive sieve change device avoids all of these appreciable drawbacks of the prior art constructions.

While there are shown and described present preferred embodiments of the invention, it is to be distinctly understood that the invention is not limited thereto, but may be otherwise variously embodied and practiced within the scope of the following claims.
ACCORDINGLY,

What is claimed is:

1. A change device for sieves for straining or filtering plastic materials moving in a predetermined direction of material flow, comprising:
   a sieve holder mountable in the direction of material flow; said sieve holder being provided with a bore for the throughflow of material;
   a plurality of sieve supports;
   a guide slot arranged transversely with respect to said bore for the passage therethrough of said sieve supports;
   each of said sieve supports comprising a perforated plate and containing at least one sieve;
   said sieve supports together with said sieves being insertable directly in succession into said sieve holder;
   one of said sieve supports and its respective sieve being located in a work position;
   a sleeve member arranged in said bore forwardly of said perforated plate for sealing said sieve support together with its sieve which is located in said work position in the direction of material flow;
   said sleeve member bearing against said perforated plate;
   a sealing ring bearing against said perforated plate and arranged following said perforated plate in said bore; and
   means for selectively forwardly advancing the successively arranged sieve supports, in order to thereby place each successive sieve in a work position.

2. The change device as defined in claim 1, wherein:
   each said perforated plate having a side confronting the direction of material flow; and
   said side of said perforated plate carrying said at least one sieve.

3. The change device as defined in claim 1, wherein:
   said advancing means comprises a fluid operated work cylinder; and
   said work cylinder being provided with a controllable outwardly and inwardly movable plunger for the stepwise feed of said sieve supports.

4. The change device as defined in claim 1, wherein:
   said perforated plate is formed of a material which is harder than the material from which there is formed said sleeve member and sealing ring.

5. The change device as defined in claim 4, wherein:
   each said sleeve member and perforated plate have coacting contact surfaces therebetween;
   each said perforated plate and sealing rings have coacting contact surfaces; and
   the contact surfaces between the sleeve member and the perforated plate and between the perforated plate and the sealing ring being relatively small, in order to ensure for a high contact pressure.

6. The change device as defined in claim 1, wherein:
   each said sleeve member and perforated plate have coacting contact surfaces therebetween;
   each said perforated plate and sealing ring having coacting contact surfaces; and
   the contact surfaces between the sleeve member and the perforated plate and between the perforated plate and the sealing ring being relatively small, in order to ensure for a high contact pressure.

7. The change device as defined in claim 1, wherein:
   said sleeve member contains inner wall means which conically taper in the direction of flow of the material and extend at least over part of its width.

* * * * *